Figure 4:
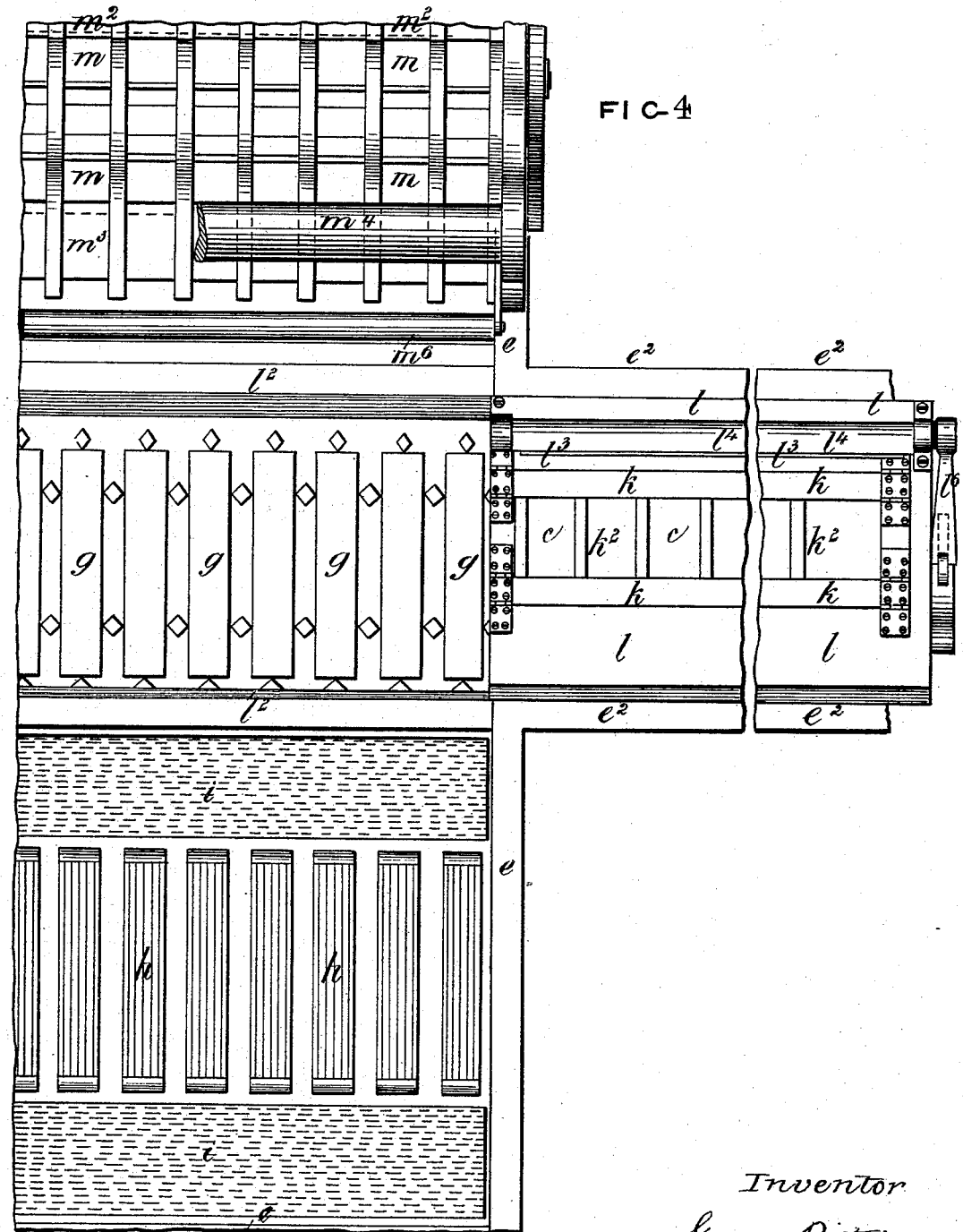
Figure 7:
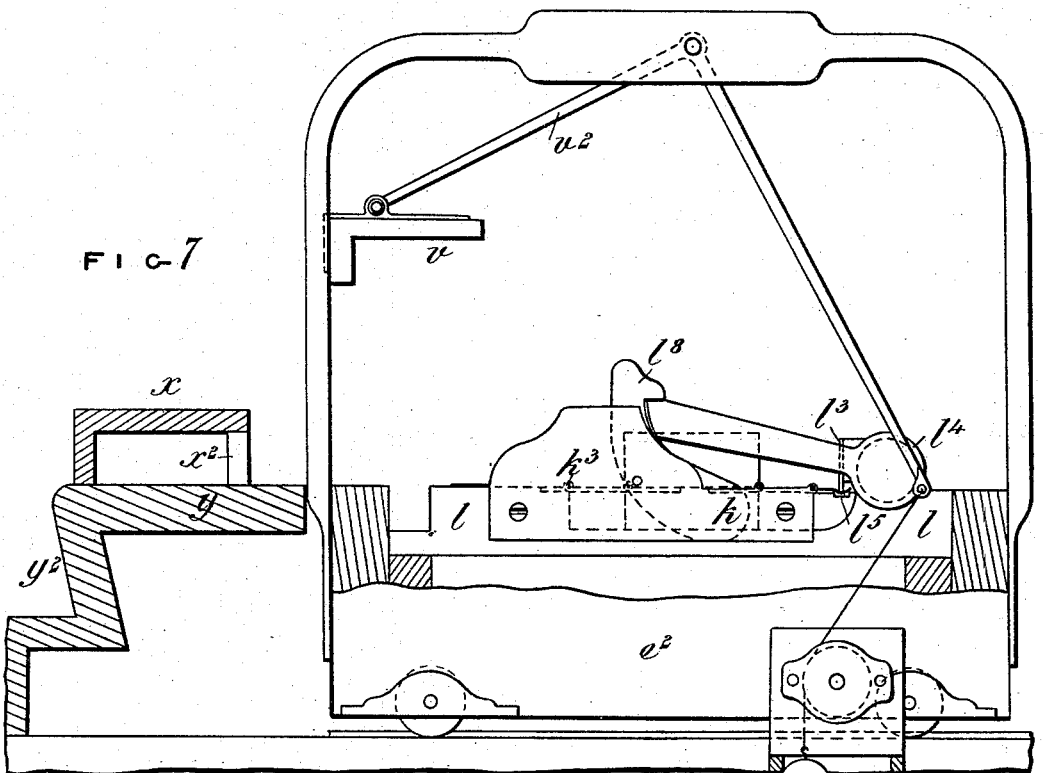

(No Model.) 7 Sheets—Sheet 1.
G. PRITCHARD.
PACKET LABELING MACHINE.
No. 252,137. Patented Jan. 10, 1882.
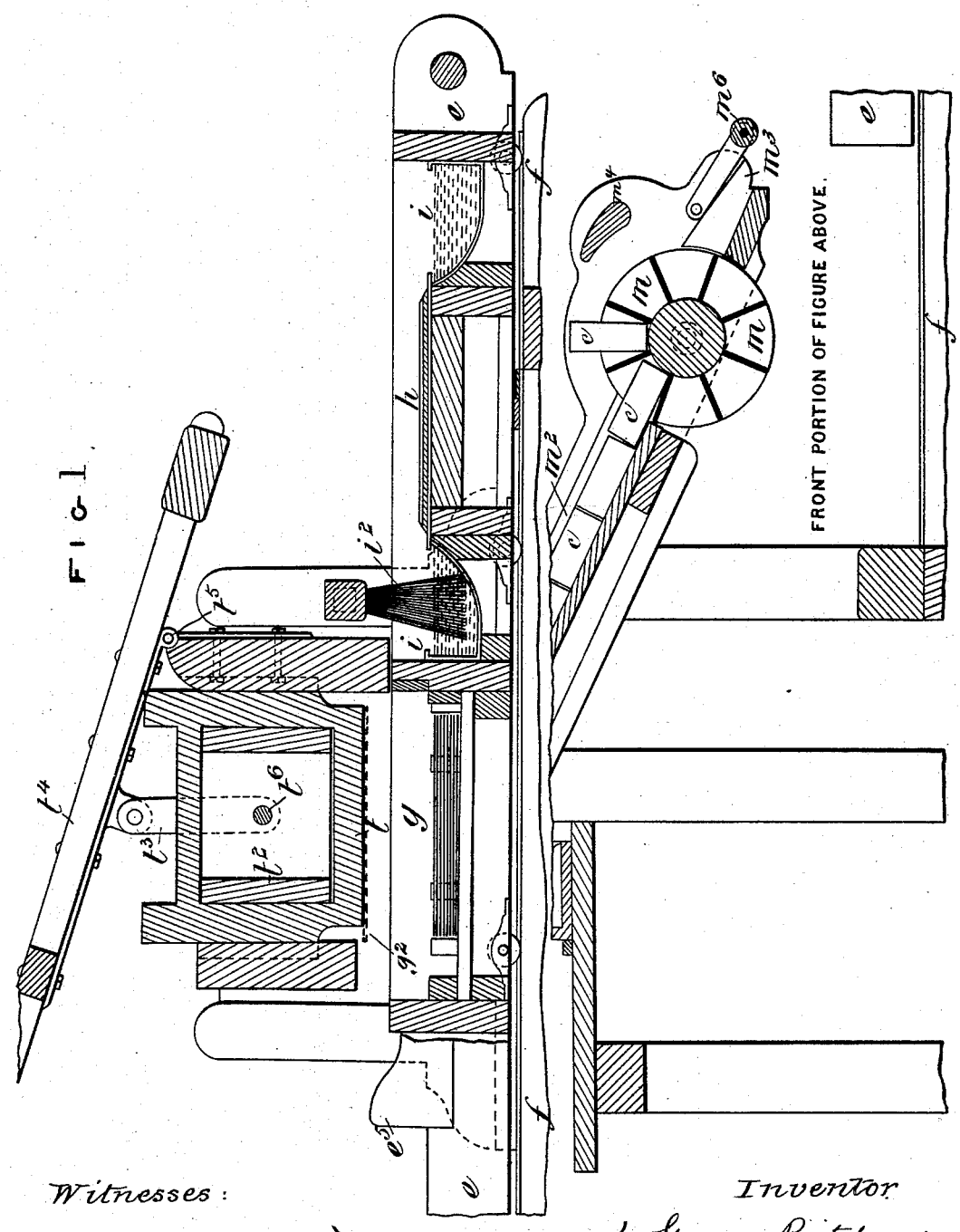

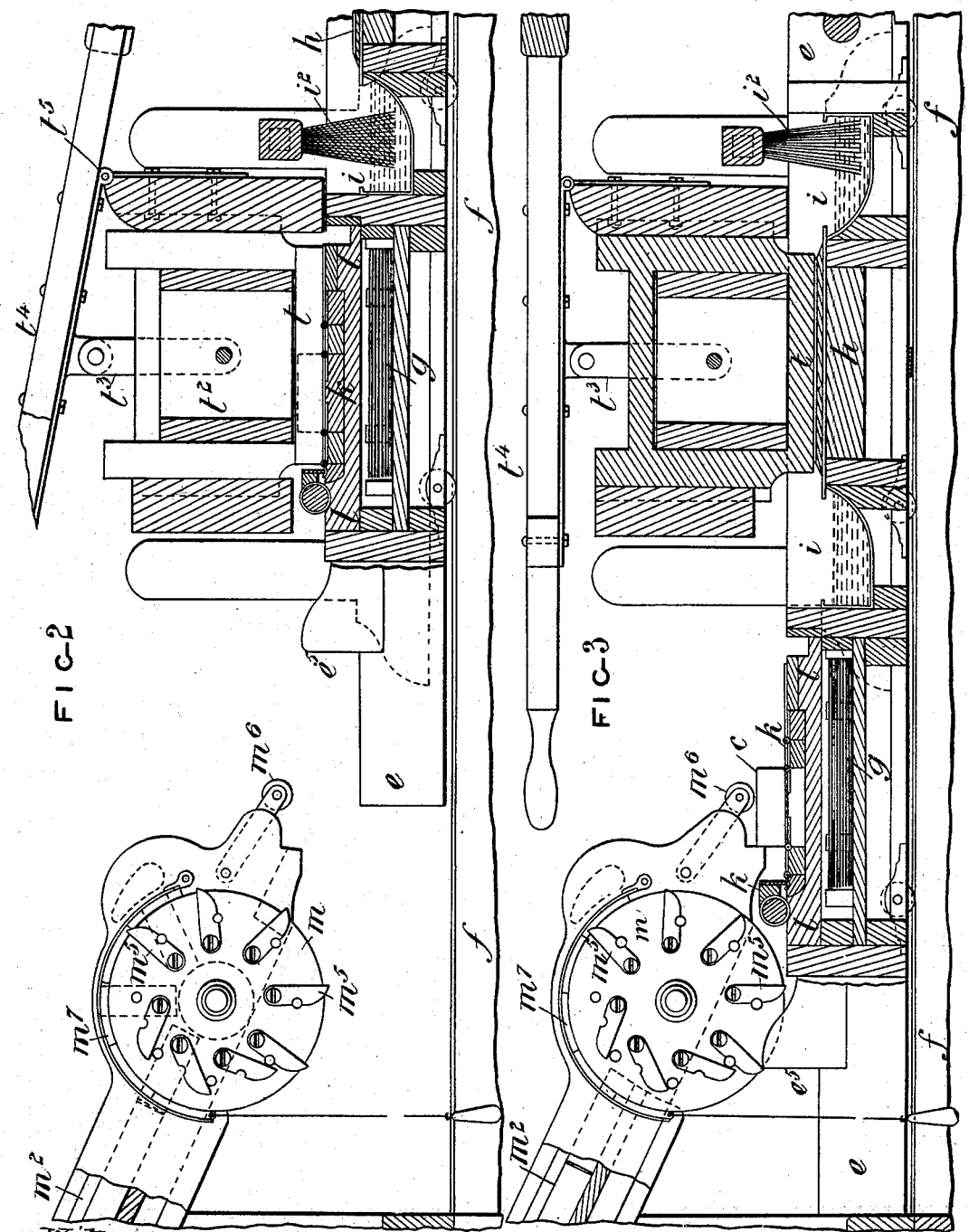

(No Model.)
7 Sheets—Sheet 3.

G. PRITCHARD.
PACKET LABELING MACHINE.

No. 252,137. Patented Jan. 10, 1882.

Witnesses:
E. E. Masson
W. B. Masson

Inventor
George Pritchard
by A. Pollok
his attorney

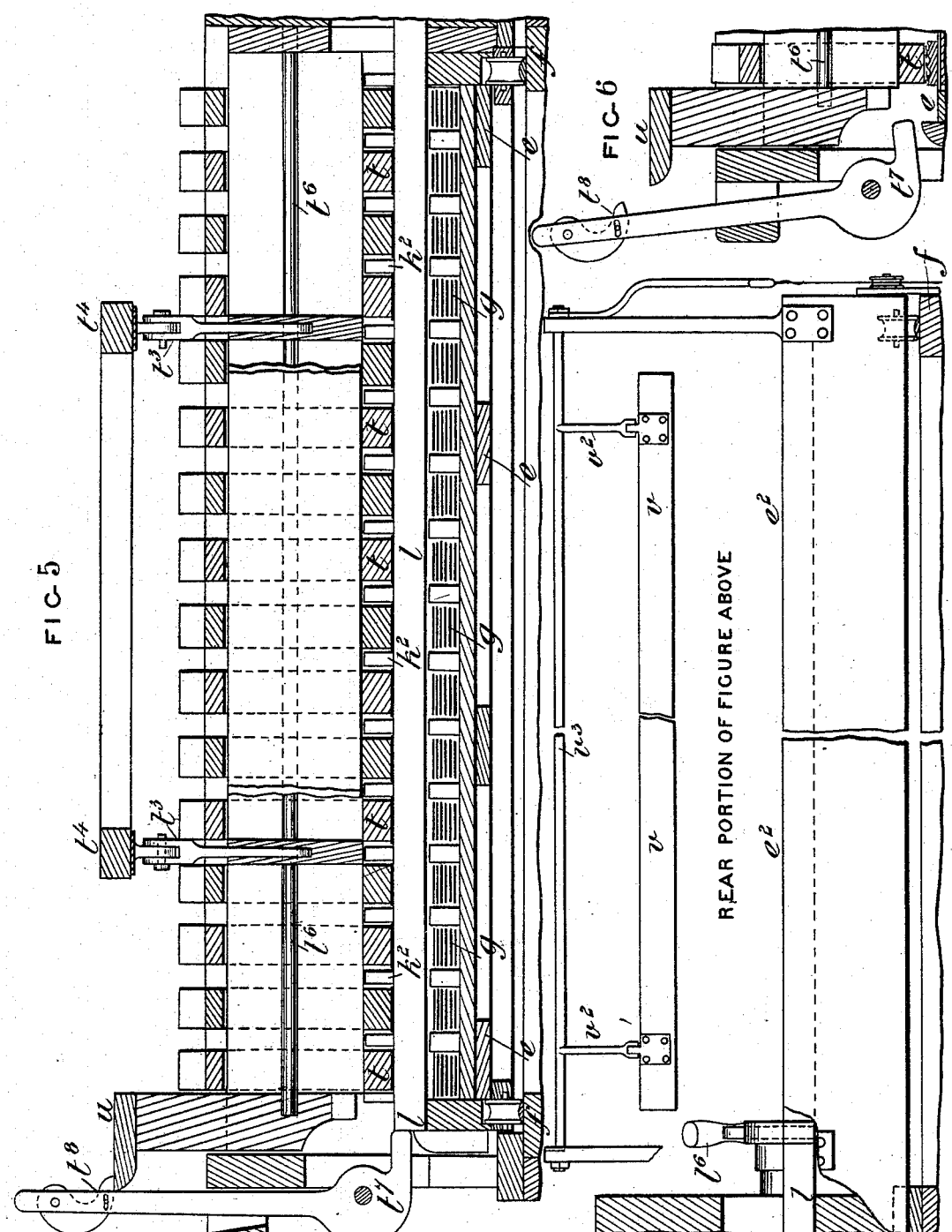

(No Model.)  7 Sheets—Sheet 5.

G. PRITCHARD.
PACKET LABELING MACHINE.

No. 252,137.  Patented Jan. 10, 1882.

Witnesses:
E. E. Masson
W. B. Masson

Inventor: George Pritchard
by A. Pollok
his attorney

N. PETERS, Photo-Lithographer, Washington, D. C.

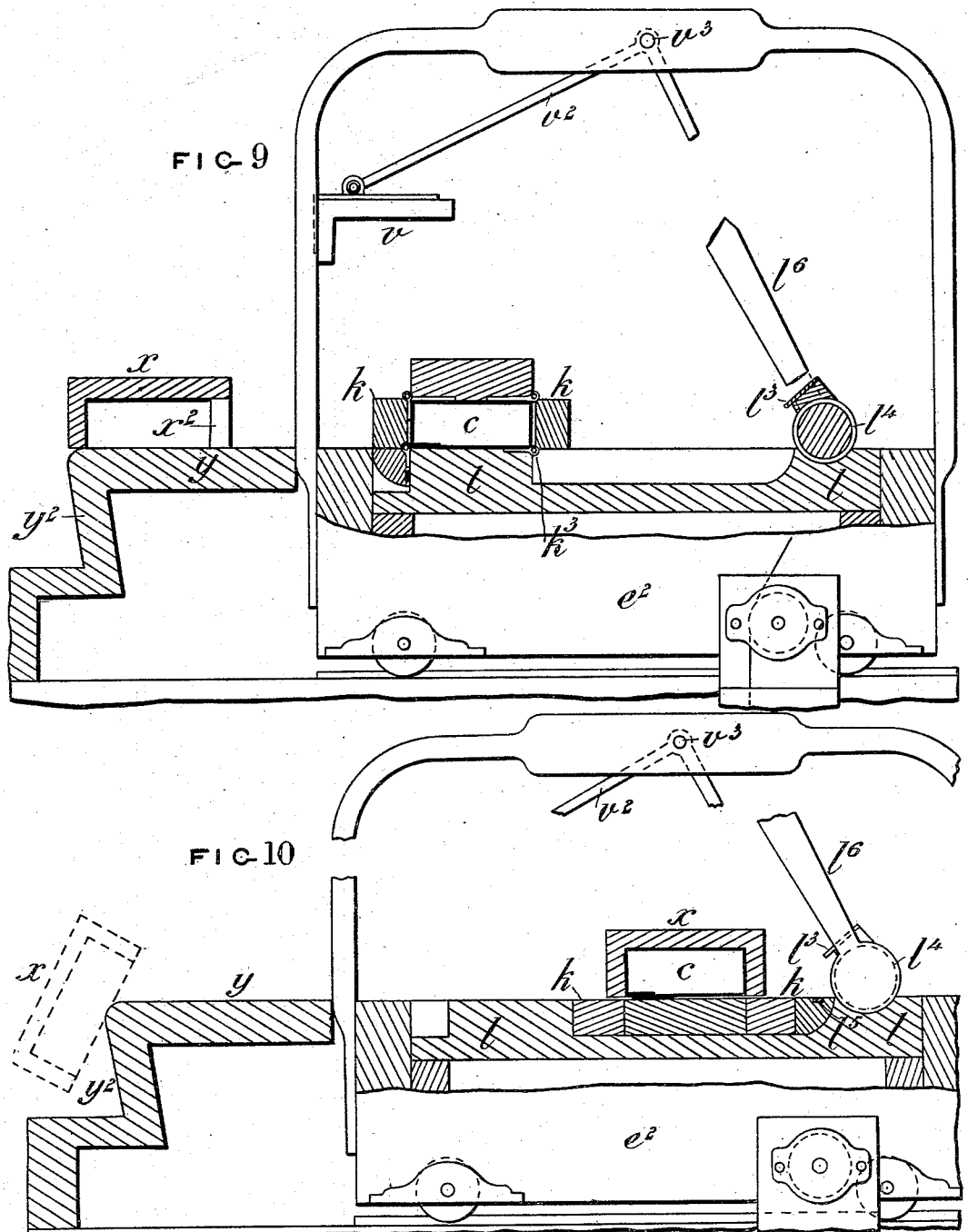

(No Model.)
G. PRITCHARD.
PACKET LABELING MACHINE.
No. 252,137. Patented Jan. 10, 1882.
7 Sheets—Sheet 7.
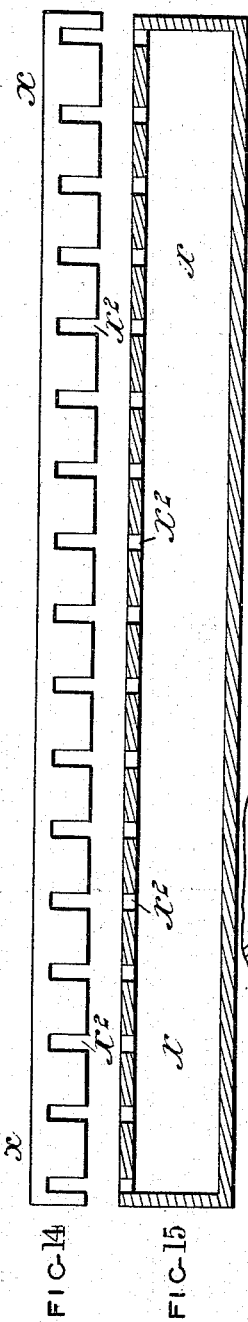
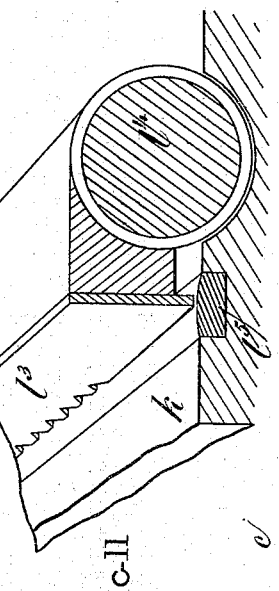
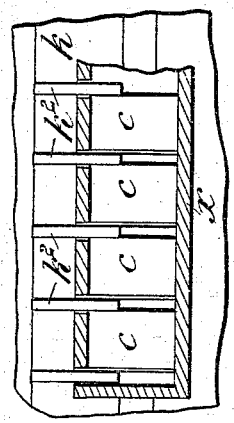
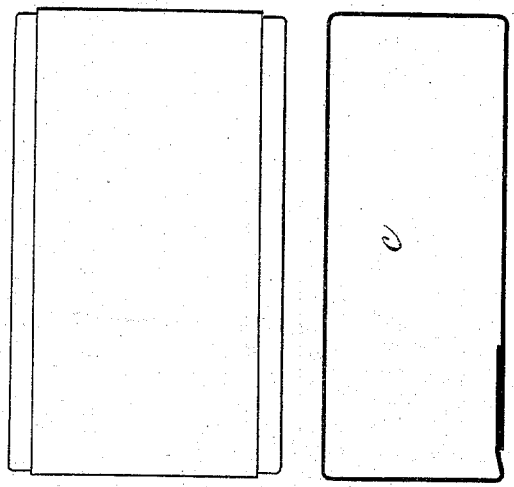
Witnesses:
E. E. Masson
W. B. Masson
Inventor
George Pritchard
by A. Pollok
his attorney

United States Patent Office.

GEORGE PRITCHARD, OF SEAFORTH, NEAR LIVERPOOL, COUNTY OF LANCASTER, ASSIGNOR TO ROBERT SPEAR HUDSON, OF LIVERPOOL, ENGLAND.

PACKET-LABELING MACHINE.

SPECIFICATION forming part of Letters Patent No. 252,137, dated January 10, 1882.

Application filed September 17, 1881. (No model.) Patented in England March 23, 1881.

*To all whom it may concern:*

Be it known that I, GEORGE PRITCHARD, a subject of the Queen of Great Britain, residing at Seaforth, near Liverpool, in the county of Lancaster, England, have invented certain new or Improved Machinery and Apparatus for Labeling Packets of Powdered Materials and other Commodities, (for which I have received Letters Patent in England, No. 1,299, dated 23d March, 1881,) of which the following is a specification.

My invention consists of the construction and combination of parts of machinery, hereinafter described, for labeling packets of powdered materials and other commodities, and also of apparatus, hereinafter described, to be used in connection with the improved labeling machinery. The packets of powdered materials, having been closed and rewrapped, are placed in inclined sluices or channels, by which they are conveyed to the labeling-machine, one portion of which consists of a horizontal sliding platform containing divisions, in which piles of labels are placed and a series of pasting-slabs, which is brought at the proper times under vertically-sliding taking-off blocks or plungers. While the taking-off blocks are in their raised positions the traveling platform is moved in a direction proper to carry it under a brush or brushes charged with paste, whereby a film or layer of paste is deposited on the corrugated surfaces of the pasting-slabs. Paste-wells on each side of the pasting-slabs supply paste to the brushes by the motion of the traveling platform. By the movement described of the traveling platform the pasting-slabs are brought immediately under the movable taking-off blocks or plungers, by the descent of which onto the pasting-slabs the said blocks take up paste from the said slabs. The taking-off blocks rising, the traveling platform is further moved in the same direction, so as to bring the divisions containing the piles of labels under the raised taking-off blocks. The taking-off blocks having paste on their under faces are now made to descend upon the upper labels of the piles of labels, and the said taking-off blocks, rising, pick up and carry with them the said upper labels.

Another part of the machine consists of a folder, which is next brought into operation. This folder consists of a series of jointed leaves or hinged flaps capable of folding around the packets, and a series of division-plates for separating the several packets. The folder works in guides, and is brought by a horizontal sliding motion over the piles of labels before described in the traveling platform, the spaces between the division-plates of the folder coming immediately under the taking-off blocks having labels on their under side. In bringing the folder into this position its fore end strikes against a holding-down catch and places it in such a position that when the taking-off blocks descend the said blocks are held in their lowered position. The descent of the taking-off blocks brings the labels on their under sides upon the surface of the folder. By means of a lever-gripe running nearly the whole length of the folder the unpasted ends of the several labels are griped or held by it. The traveling platform, together with the folder, is next moved from under the taking-off blocks. By this motion the labels are drawn from off the under side of the taking-off blocks onto the folder and the paste distributed uniformly over the surface of the said labels.

By the last-described movement of the platform the labels are brought under the guide spouts or chutes of a pocketed drum containing the packets of powdered material to be labeled. As the traveling platform is moved under the guide spouts or chutes a projection on one end of the platform carrying the folder strikes against one of a series of pawls on one end of the pocketed drum, causing the latter to be partly rotated and the packets contained in one set of the divisions to be thrown down the guide-spouts and deposited upon the pasted surfaces of the labels lying on the folder. The traveling platform has now a slight to-and-fro motion given to it for the purpose of placing the several packets lying upon the labels in the same line. The position of the folder is now changed by sliding it along guides, forming a lateral continuation of the traveling platform. The folder is next brought under swing-arms, at the lower extremities of which an angular longitudinal stop or half-tray is situated, which holds the packets in position while the folding leaves or flaps of the folder (after the ends of the labels have been released from the gripe) envelop or embrace the ends of the packets, and thereby press the labels around the said packets. The folding-flaps being opened leaves the packets which have been thus labeled between the division-plates on the folder. In the packets thus labeled the principal part of the labels are undermost, and in order to remove them from the folder and reverse the packets a rectangular trough-formed box is placed over the packets on the division plates, gaps or passages made in one side of the said box passing over the said division-plates. By drawing the box from off the folder the packets are carried with it, and by inverting the box the several packets are inverted, so as to bring the principal portions of the labels uppermost.

I will now proceed to describe, with reference to the accompanying drawings, the manner in which my invention is to be performed.

Figures 1, 2, and 3 represent longitudinal vertical sections of the labeling-machine, the parts being in different positions. Fig. 4 represents a plan of a portion of the machine with the folder in its withdrawn or back position, the sliding taking-off blocks or plungers being omitted. Fig. 5 represents the machine partly in side elevation and partly in vertical section, the sectional parts being taken through the piles of labels, the folder being shown in its advanced position under the piles of labels. Fig. 6 represents a portion of the machine in section, taken through the pasting-slabs. Figs. 7, 8, 9, and 10 represent, drawn to a larger scale, end elevations, partly in section, of the lateral continuation of the traveling platform carrying the folder, the said Figs. 7, 8, 9, and 10 exhibiting the action of the folder. Fig. 11 represents in perspective, partly in section, drawn to a larger scale, the serrated lever-gripe used for holding down the unpasted ends of the labels.

The same letters of reference indicate the same parts in Figs. 1 to 11, both inclusive.

$e$ is the horizontal sliding platform, supported on wheels and working on the base $f$ of the machine, and $e^2$ is the lateral extension of the said platform, carrying the folder. (See Fig. 4.) The said horizontal sliding platform $e$ carries the following parts, namely: the series of parallel piles of labels $g\ g\ g$, the series of parallel pasting-slabs $h\ h\ h$, having corrugated surfaces, and the pasting-wells $i\ i$ on each side of the said pasting-slabs $h$.

$i^2\ i^2$ are the brushes by which paste is supplied from the wells $i\ i$ to the pasting-slabs $h$ as the traveling platform is moved in either direction. The lateral extension $e^2$ of the traveling platform $e$ carries the folder $k$, consisting of a series of jointed leaves or flaps. The said folder $k$ is furnished with a series of cross-division plates or bars, $k^2\ k^2$, for separating the several packets. The said folder is jointed at $k^3$, by one of its flaps, to the bed-plate $l$, which works in the lateral extension $e^2$ of the traveling platform $e$, and is also capable of being advanced on the guides $l^2\ l^2$ (see Fig. 4) over the piles of labels $g\ g\ g$ on the principal traveling platform $e$, (see Figs. 2 and 3,) where the said folder and its sliding bed-plate are represented in their advanced position. The sliding bed-plate $l$ of the folder $k$ carries the lever-gripe $l^3$ for griping the unpasted ends of the series of labels. The said lever-gripe is carried by the roller $l^4$, extending the whole length of the folder $k$, the ends of the said roller turning in bearings in the folder-bed $l$. (See Fig. 4 and the enlarged views, Figs. 7, 8, 9, 10, and 11.) The said lever-gripe $l^3$ is raised and lowered by the handle $l^6$, and is held in its depressed acting position by the catch $l^8$.

Along one side of the folder $k$ is an india-rubber seat, $l^5$, between which and the corrugated or undulating edge of the lever gripe the labels are held or griped.

$t\ t$ are the vertically-sliding taking-off blocks or plungers. The said blocks $t\ t$ are arranged or strung upon the trough-shaped support $t^2$, the trough having a little play within the blocks. The support $t^2$ is connected by the links $t^3\ t^3$ to the connected levers $t^4\ t^4$, the latter being jointed at $t^5$ to the fixed frame of the machine. The links $t^3\ t^3$ turn on the stay-rod $t^6$ passing through the hollow or trough support $t^2$. By raising or lowering the levers $t^4\ t^4$ the trough-support $t^2$ rises or falls and carries with it the series of plungers or taking-off blocks $t\ t$. The said blocks $t\ t$ work in guides in the uprights of the machine. The taking-off blocks $t\ t$ are held in their lowered positions by the lever-catch $t^7$. (See Figs. 5 and 6.) This catch is operated by the sliding bed $l$ of the folder $k$. The said bed, when advanced over the piles of labels $g\ g$ on the principal platform $e$, puts the lever-catch $t^7$ into the position represented in Fig. 5, and on the descent of the taking-off blocks $t\ t$ the projecting part $u$ on the said blocks pushes back the jointed catch $t^8$, which catch, after the part $u$ has passed it, passes over the said part and holds down the taking-off blocks while the pasted labels are drawn from under the said blocks, as hereinafter explained. When the folder $k$ on the folder-bed $l$ is withdrawn to the position represented in Fig. 4 the lever-catch $t^7$ returns to the position represented in Fig. 6, and the taking-off blocks $t\ t$ may be raised.

$m$ is the pocketed and divided rotary drum into which the packets to be labeled are conveyed by the inclined guide spouts or chutes $m^2$, the said packets being removed from the said drum by the delivery-spouts $m^3$ and deposited onto the pasted surfaces of the labels lying on the folder $k$. The drum $m$ is rotated through the required angle, so as to deliver the series of packets from its compartments at the proper time, by the action of the projection or shoulder $e^5$ on the traveling platform $e$ upon one of the pawls $m^5$ on the said pocketed drum.

$m$. (See Figs. 2 and 3.) The packets are prevented from being thrown out of the pockets during the partial rotation of the drum by the fixed guide-arm $m^4$, and the roller $m^6$, carried by a jointed arm at the mouths of the delivery-chutes $m^3$, regulates the fall of the packets onto the pasted labels on the folder. A brake, $m^7$, (see Figs. 2 and 3,) pressed upon the drum $m$ by a weighted cord, steadies its motion and retains it in the position to which it has been brought by the action of the platform $e$.

The action of the machine is as follows: I will first describe the way in which the labels are pasted and conveyed to the folder. The traveling platform $e$ being in the position represented in Fig. 1, it is moved to the left hand. By this movement the pasting-slabs $h\ h$ are brought under the taking-off blocks $t\ t$, the said slabs having had deposited on their corrugated surfaces a film or layer of paste received from the brushes $i^2$ as the said slabs passed under them. By the descent of the taking-off blocks $t$ upon the pasting slabs $h$, as illustrated in Fig. 3, the taking-off blocks receive paste from the said slabs. The taking-off blocks $h$ being allowed to rise, the traveling platform $e$ is moved into the position represented in Fig. 1, so as to bring the series of piles of labels $g$ under the raised taking-off blocks $t$. The taking-off blocks $t$, having paste on their under faces, are now made to descend upon the upper labels of the piles of labels $g$, and the said taking off blocks, rising, pick up and carry with them the said upper labels, those ends of the labels projecting from the taking-off blocks being unpasted, as seen in Fig. 1, where a label is indicated in dotted lines, the unpasted end being marked $g^2$. The parts being in the position last described, the bed $l$, carrying the folder $k$, is pushed from the lateral extension $e^2$ of the traveling platform $e$ over the piles of labels $g\ g$ in the principal part of the traveling platform, as illustrated in Fig. 2, the said motion of the folder-bed $l$ bringing into its changed position the lever-catch $t^7$ for holding down the taking-off blocks when they next descend. The taking-off blocks carrying the pasted labels are now made to descend upon the folder $k$, as illustrated in Fig. 2, and are held there by the lever-catch $t^7$; but the said catch permits the taking-off blocks to rise slightly to partly liberate the labels and to clear the said blocks from the face of the folder. The lever-gripe $l^3$ is now turned down by its handle $l^6$, so as to gripe the unpasted ends $g^2$ of the labels between its edge and the elastic seat $l^5$, the said gripe being held in its griping position by the catch $l^8$. (See Fig. 7.) The traveling platform $e$, together with the folder $k$, is now moved into the position represented in Fig. 3. By this movement the labels are drawn from off the under sides of the taking-off blocks $h$ onto the folder $k$ and the paste distributed uniformly over the surface of the said labels, and the pasting-slabs are again brought under the taking-off blocks, as represented.

By the last-described movement of the traveling platform $e$ the labels are brought under the delivery spouts or chutes $m^3$ of the pocketed drum $m$, containing the packets $c\ c$ of powdered material. As the traveling platform $e$ is moved under the said spouts $m^3$ the projection $e^5$ on the said platform strikes against one of the pawls $m^5$ on the drum $m$ and gives rotation to the said drum through such an angle as will cause the packets $c\ c$ contained in one set of the divisions or pockets to be thrown down the guide or delivery spouts $m^3$ and deposited on the pasted surfaces of the labels lying on the folder $k$, the packets passing between the division-bars $k^2$ on the said folder. By now giving the traveling platform a slight to-and-fro motion the several packets lying upon the labels on the folder are placed in the same line by being brought against the square shoulder below the delivery chutes or spouts $m^3$ of the pocketed drum. It must be understood that the same motion of the traveling platform which causes the packets to be fed from the drum $m$ and deposited on the folder $k$ also brings the pasting-slabs $h$ under the taking-off blocks $t$, as seen in Fig. 3, so that the taking-off blocks may receive a coating of paste, ready on the return-stroke of the traveling platform to pick up another set of labels from the piles $g$, and so on. The packets $c$ having been deposited in the manner described on the folder $k$ (see Fig. 3) and separated from each other by the division-bars $k^2$, the bed $l$, carrying the folder $k$, is drawn from over the sets of labels $g$ and returned to the lateral extension $e^2$ of the traveling platform, as seen in Fig. 4.

Figure 8:
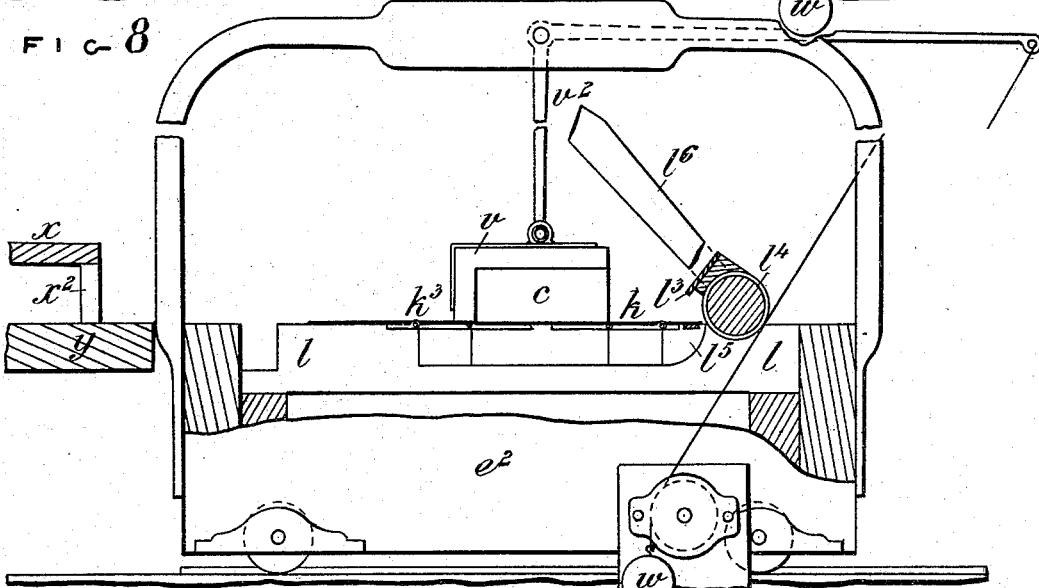

The further action of the machine by which the labels are folded upon and pasted to the packets will be best understood by referring to Figs. 7, 8, 9, and 10. The folder $k$, with the labels and packets upon it, having been brought into the position Fig. 4, the lever-gripe $l^3$ is removed from the unpasted ends of the labels, as illustrated in Fig. 8, and the angular longitudinal stop or half-tray $v$, carried by the swing-arms $v^2$ and axis $v^3$, is lowered and brought over and pressed upon the packets $c$, so as to hold them in position during the first stage of the labeling operation, as represented in Fig. 8. By now folding the leaves or flaps of the folder $k$ upon the packets $c$, commencing at the seat end $l^5$ of the folder, the said leaves or flaps are made to envelop or embrace the said packets $c$, and thereby press the pasted labels around the packets, as represented in Fig. 9. A packet labeled in the manner described is represented in Figs. 12 and 13. As soon as the unpasted ends of the labels have been folded upon the packets the stop or half-tray $v$ is loosened when it returns to its normal position by the action of the counterbalance-weight $w$. The flaps of the folder being opened leaves the packets which have been thus labeled between the division-bars $k^2$ on the folder $k$.

The labeled packets have the principal part of the labels on their under sides, and in order readily to reverse the packets and remove them from the folder I use a rectangular trough-formed box of the kind represented in side elevation in Fig. 14 and horizontal section in Fig. 15, and marked $x$. In one side of the said box $x$ are gaps or slots $x^2$, which can pass over the division-bars $k^2$ on the folder. By placing the trough-box $x$ over the labeled packets on the folder, as illustrated in Fig. 10 and in the separate view, Fig. 16, and drawing the box from off the folder, the packets $c\,c$ are carried onto a table, $y$, where the said box is inverted by supporting it against the shoulder $y^2$. The several packets are thus inverted so as to bring the principal parts of the labels uppermost. One of the trough-boxes after it has been inverted is shown at $y^3$, Fig. 17.

The labeled packets are packed for sale in the ordinary way.

The labeling machinery described and represented may be used for labeling packets generally.

Having now described the nature of my invention and the manner in which the same is to be performed, I wish it to be understood that I claim as my invention of new or improved machinery and apparatus for labeling packets of powdered materials and other commodities—

1. In a labeling-machine, the traveling platform carrying a series of labels, pasting-slabs, paste-wells, and a folder, substantially as described.

2. The combination, with the traveling platform and pasting-slabs thereon, of the vertically-sliding taking-off blocks or plungers, substantially as described.

3. The combination, with the traveling platform and taking-off blocks or plungers, of the folder and lever-gripe, substantially as and for the purpose described.

4. In a labeling-machine, the combination, with the traveling platform, of the pocketed drum, operated by the movement of said platform, substantially as described.

5. The combination, with the traveling platform and parts connected therewith, of the folder supported on a sliding bed-plate, substantially as described.

6. A labeling-machine comprising a traveling platform, pasting-slabs, paste-wells, and folder carried by said platform, a pocketed drum, and taking-off blocks or plungers, all combined and operating substantially as described.

GEORGE PRITCHARD. [L. S.]

Witnesses:
 W. P. PAULL,
 *Vice and Deputy Consul, U. S. A., at Liverpool.*
 W. J. SULIS,
 *U. S. Consulate, Liverpool.*